United States Patent
Kohli et al.

(10) Patent No.: US 9,547,509 B2
(45) Date of Patent: Jan. 17, 2017

(54) SYSTEM AND METHOD FOR INFORMATION ACQUISITION OF WIRELESS SENSOR NETWORK DATA AS CLOUD BASED SERVICE

(71) Applicant: SAMSUNG ELECTRONICS CO., LTD., Suwon-si (KR)

(72) Inventors: Soma Kohli, Bangalore (IN); Ankur Deshwal, Muzaffar Nagar (IN); Chethan K. Puttanna, Gubbi taluq (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 13/772,021

(22) Filed: Feb. 20, 2013

(65) Prior Publication Data
US 2013/0227569 A1    Aug. 29, 2013

(30) Foreign Application Priority Data

Feb. 23, 2012   (IN) .............................. 678/CHE/2012

(51) Int. Cl.
G06F 9/45     (2006.01)
G06F 9/455    (2006.01)
H04W 4/00     (2009.01)

(52) U.S. Cl.
CPC .......... *G06F 9/455* (2013.01); *G06F 9/45558* (2013.01); *H04W 4/003* (2013.01); *H04W 4/006* (2013.01); *G06F 2009/45562* (2013.01)

(58) Field of Classification Search
CPC ....................................................... G06F 9/455
See application file for complete search history.

(56) References Cited

U.S. PATENT DOCUMENTS

| | | | |
|---|---|---|---|
| 8,279,810 B1* | 10/2012 | Li et al. ......................... | 370/328 |
| 8,958,293 B1* | 2/2015 | Anderson ........... | H04L 67/1002 370/230 |
| 2005/0183096 A1* | 8/2005 | Branigan et al. ............. | 719/328 |
| 2005/0198303 A1* | 9/2005 | Knauerhase .......... | G06F 9/5055 709/227 |
| 2011/0153697 A1* | 6/2011 | Nickolov et al. ............. | 707/827 |
| 2012/0063387 A1* | 3/2012 | Chen .............................. | 370/328 |
| 2012/0147894 A1* | 6/2012 | Mulligan et al. ........ | 370/395.53 |
| 2012/0176938 A1* | 7/2012 | Padmanabh et al. ......... | 370/255 |
| 2012/0311564 A1* | 12/2012 | Khalid .............................. | 718/1 |

(Continued)

OTHER PUBLICATIONS

Directly, Wiktionary, retrieved on Dec. 1, 2014, https://en.wiktionary.org/wiki/directly.*

(Continued)

*Primary Examiner* — Emerson Puente
*Assistant Examiner* — Charlie Sun
(74) *Attorney, Agent, or Firm* — NSIP Law (57) ABSTRACT

A system and a method for information acquisition of Wireless Sensor Network (WSN) data as a cloud based service are provided. An apparatus in the system including a WSN, a service cloud, and a device, includes a virtual sensor configured to receive data from a physical sensor in the WSN. The apparatus further includes a virtual sensor controller configured to receive a request for the data from the service cloud or the device, and spawn a virtual machine (VM) based on the request. The apparatus further includes the VM configured to transmit the data to the service cloud or the device.

20 Claims, 5 Drawing Sheets

(56) References Cited

U.S. PATENT DOCUMENTS

| | | | |
|---|---|---|---|
| 2013/0173028 A1* | 7/2013 | Felty | G05B 13/02 |
| | | | 700/79 |
| 2013/0194310 A1* | 8/2013 | Vasudevan et al. | 345/660 |
| 2013/0347025 A1* | 12/2013 | Prakash et al. | 725/25 |
| 2014/0304544 A1* | 10/2014 | Takenaka | 714/4.2 |

OTHER PUBLICATIONS

Xuxian Jiang, Dongyan Xu, Soda: a Service-On-Demand Architecture for Application Service Hosting Utility Platforms, Proceedings of the 12th IEEE International Symposium on High Performance Distributed Computing (HPDC'03), IEEE, 2003.*
charaterize, dictionary.com. retrieved on Mar. 3, 2015.*

\* cited by examiner

SYSTEM AND METHOD FOR INFORMATION ACQUISITION OF WIRELESS SENSOR NETWORK DATA AS CLOUD BASED SERVICE

CROSS-REFERENCE TO RELATED APPLICATION(S)

This application claims the benefit under 35 U.S.C. §119(a) of Indian Patent Application No. 678/CHE/2012, filed on Feb. 23, 2012, in the Indian Patent Office, the entire disclosure of which is incorporated herein by reference for all purposes.

BACKGROUND

1. Field

The following description relates to a system and a method for information acquisition of Wireless Sensor Network (WSN) data as a cloud based service.

2. Description of Related Art

Wireless Sensor Networks (WSNs) may transform peoples' daily lives. A WSN senses and disseminates information from various environments, and may serve many diverse applications. In more detail, a WSN is a network of physical sensors that may include several hundred nodes, which spatially and temporally track environments of interest to sample physical data, such as a temperature, a humidity, a light, an inclination, an acceleration, a chemical, a substance, a physiological measurement, an environmental change, and/or other physical data known to one of ordinary skill in the art. This data is then either stored temporarily in the local nodes or wirelessly transmitted immediately to a gateway. WSNs can be used to monitor as well as control, and they form a constituent of ubiquitous sensing, communication, computing, and control.

WSNs are deployed for a wide range of applications, such as environmental monitoring, location tracking, military intelligence (surveillance), precision agriculture, disaster management services, factory instrumentation, hospital management and information tracking, and/or other applications known to one of ordinary skill in the art. With use of WSN technology likely to increase many fold, a large amount of WSN data will be generated. This valuable, informative data will remain underutilized if not made accessible to end users.

Integrating WSNs with a cloud computing infrastructure eases management of storage and computational resources. It also provides application data over the Internet. Combining WSNs with cloud computing makes it easier to share and analyze real-time sensor data on-the-fly. It also provides sensor data or sensor events as a service over the Internet.

Conventional methods use an ad-hoc process and thread based solution to send WSN data to a cloud. The use of ad-hoc processes and threads for data collection and forwarding requires recompilation/porting of logic for different platforms. Moreover, ad-hoc processes and threads require assistance for load balancing in a network. Some existing methods provide an infrastructure for abstraction of physical sensors, but these fail to provide the abstraction with flexibility and scalability.

Accordingly, there is still a huge gap in bringing together information available from heterogeneous, distributed resources of WSNs to a non-localized user. As such, a system and a method to enhance WSNs' data availability, accessibility, and utilization using cloud computing is appreciated.

SUMMARY

In one general aspect, there is provided an apparatus in a system including a wireless sensor network (WSN), a service cloud, and a device, the apparatus including a virtual sensor configured to receive data from a physical sensor in the WSN. The apparatus further includes a virtual sensor controller configured to receive a request for the data from the service cloud or the device, and spawn a virtual machine (VM) based on the request. The apparatus further includes the VM configured to transmit the data to the service cloud or the device.

In another general aspect, there is provided a method of a virtual sensor cloud in a system including a wireless sensor network (WSN), a service cloud, and a device, the method including receiving data from a physical sensor in the WSN. The method further includes receiving a request for the data from the service cloud or the device, and spawning a virtual machine (VM) based on the request. The method further includes transmitting the data to the service cloud or the device.

In still another general aspect, there is provided an architecture in a system including a wireless sensor network (WSN), a service cloud, and a device, the architecture including a virtual sensor configured to receive data from a physical sensor in the WSN. The architecture further includes a virtual sensor controller configured to receive a request for the data from the service cloud or the device, and spawn a virtual machine (VM) based on the request. The architecture further includes the VM configured to send the data to the service cloud or the device.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

According to the teachings below, there is provided a system and a method for virtualization of Wireless Sensor Networks (WSNs) enabling cloud based end-to-end solutions. A cloud based WSN system utilizing the virtualized WSNs provides a virtual sensor cloud as an Infrastructure as a Service (IaaS), and a service cloud as a Software as a Service (SaaS), to provide a flexible and scalable system. The IaaS provides flexibility by handling heterogeneous WSNs. The SaaS provides scalability by relieving end users of computational overheads, and enabling on-demand sharing of sensor data to requesting end users. The SaaS also relieves end users from specifying sensor characteristics, locating physical sensors, and provisioning for the physical sensors.

An end user, via a device, requests and receives services provided by the system. For example, the device may include a smart phone, a Personal Digital Assistants (PDA), a tablet, a personal computer, a laptop and/or other devices known to one of ordinary skill in the art. The services may include, for example, acquisition, reformatting, processing, and delivery of data from the physical sensors, and/or other services known to one of ordinary skill in the art.

The system provides data available from heterogeneous, distributed resources (i.e., the physical sensors) of the WSNs to a non-localized (remote) end user through the service cloud using wired or wireless communication networks. For example, the physical sensors may include a pressure sensor, an accelerometer, a camera, a thermal sensor, a humidity sensor, a microphone, and/or other physical sensors known to one of ordinary skill in the art. The wired or wireless communication networks may include, for example, Ethernet, General Packet Radio Service (GPRS), Enhanced Data rates for GSM Evolution (EDGE), 3G, Long Term Evolution (LTE), Wireless-Fidelity (Wi-Fi), and/or other communication networks known to one of ordinary skill in the art.

Thus, the system provides an optimal WSN data utilization by easing WSN data accessibility to an end user. Throughout the description, Wireless Sensor Network (WSN) and Physical Sensor Network (PSN) are used interchangeably. In addition, the term "cloud" refers to computing resources (hardware and software) or architecture that are delivered as a service over a network (typically the Internet).

Figure 1:
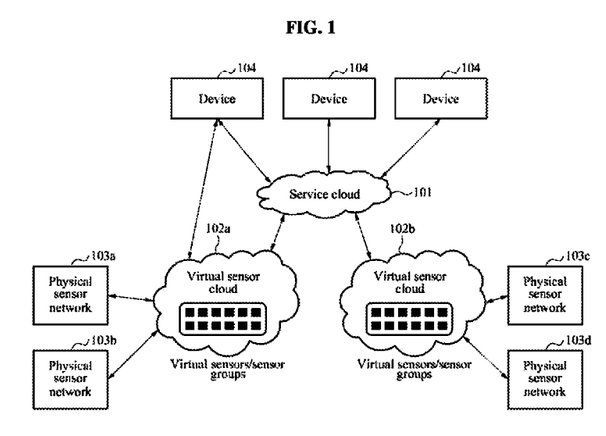
FIG. 1 is a diagram illustrating an example of a cloud based Wireless Sensor Network (WSN) system utilizing virtualized WSNs to provide end-to-end cloud based solutions.

FIG. 1 is a diagram illustrating an example of a cloud based WSN system utilizing virtualized WSNs to provide end-to-end cloud based solutions. Referring to FIG. 1, the system includes a service cloud 101, virtual sensor clouds 102a and 102b, physical sensor networks 103a, 103b, 103c, and 103d, and one or more devices 104.

Each of the physical sensor networks 103a, 103b, 103c, and 103d includes a network of one or more wired or wireless physical sensors (sensor nodes) and a gateway. The physical sensor networks 103a, 103b, 103c, and 103d capture sensor data, and transmit the data to their respective virtual sensor clouds 102a and 102b, which enable virtualization of the sensors.

For example, the physical sensors may include a pressure sensor, an accelerometer, a camera, a thermal sensor, a humidity sensor, a microphone, and/or other physical sensors known to one of ordinary skill in the art. Each sensor may monitor and capture parameters at different locations as the sensor data. The parameters may include, for example, a temperature, a humidity, a vehicular movement, a lightning condition, a pressure, a soil makeup, noise levels, a presence or absence of kinds of objects, mechanical stress levels on attached objects, characteristics such as a speed, a direction, and a size of an object, and/or other parameters known to one of ordinary skill in the art. The sensors may be interconnected with a communication protocol, such as ZigBee, Bluetooth, Wi-Fi, and/or other communication protocols known to one of ordinary skill in the art. The sensors are connected to the gateway, which transmits the data captured by the sensors to a computation node outside the physical sensor network 103a, 103b, 103c, or 103d. The gateway can be a separate device, or can be embedded onto the sensors.

The virtual sensor clouds 102a and 102b virtualize the physical sensor networks 103a, 103b, 103c, and 103d through Virtual Machines (VMs). That is, the virtual sensor clouds 102a and 102b enable abstraction of the sensor data received from the physical sensor networks 103a, 103b, 103c, and 103d. In more detail, the virtual sensor clouds 102a and 102b receive the data from the physical sensor network 103a, 103b, 103c, and 103d, and convert the data into an abstract format called virtual sensors. Each of the virtual sensor clouds 102a and 102b includes the virtual sensors or virtual sensor groups.

The abstraction of the data is a mechanism where resources (i.e., the physical sensors) are hidden from end users. The users can only use the resources without knowing locations of the resources from where the data is retrieved and to where the data is stored.

The end users access the system through the devices 104. Each of the devices 104 may transmit a request to the service cloud 101 to access the sensor data in the virtual sensors in the virtual sensor clouds 102a and 102b. Each of the devices 104 may also directly transmit a request to the virtual sensor clouds 102a and 102b to access the data in the virtual sensors in the virtual sensor clouds 102a and 102b.

In response to the request, the virtual sensor clouds 102a and 102 transmit the sensor data to the service cloud 101, where the data is processed and transmitted to the devices 104 to service the requesting device(s) 104. That is, the system provides the requested data from the physical sensor networks 103a, 103b, 103c, and 103d to the requesting device(s) 104 through a scalable and flexible framework provided by an IaaS and a SaaS of cloud computing.

In more detail, the virtual sensor clouds 102a and 102b correspond to the IaaS, and provide platform independence, load balancing, and enhanced efficiency. applications in the service cloud 101 correspond to the SaaS, and provide data manipulation that enables flexible reuse of common operations on the sensor data. The SaaS applications also enable transfer of computationally intensive applications from the power critical devices 104 to a less power sensitive computing environment of the service cloud 101.

The SaaS applications perform needed operations on the sensor data received from the virtual sensor clouds 102a and 102b, and transmit the processed data to end applications on the devices 104 for display. For example, the SaaS applications can be used for generic data manipulation services, application specific services, and/or other services known to one of ordinary skill in the art.

Generic data manipulation services provide the common operations on the sensor data, such as data aggregation services, data reformatting services, and/or data storage services. The system enhances flexibility and a resource utilization by making the generic data manipulation services available as common services. For example, a video surveillance application receives sensor data from many surveillance video cameras (i.e., the physical sensors in the physical sensor networks 103a, 103b, 103c, and 103d) through the virtual sensor clouds 102a and 102b. The data can be in different video formats. To use the data in the single video surveillance application, all of the data has to be converted to the same format. The generic data manipulation services of the video surveillance application perform the data format conversion.

Application specific services may include applications developed for the manipulation of the sensor data. For example, a weather forecasting service receives environmental data as input, and manipulates the environmental data to provide weather forecasting.

In an example, hosting of the SaaS applications can be done on public clouds through vendors providing SaaS services. Alternatively, the hosting of the SaaS applications can be done on a private cloud by creating a private virtualization based infrastructure that allows loads on the applications to be dynamically shared among the resources of the IaaS.

Figure 2:
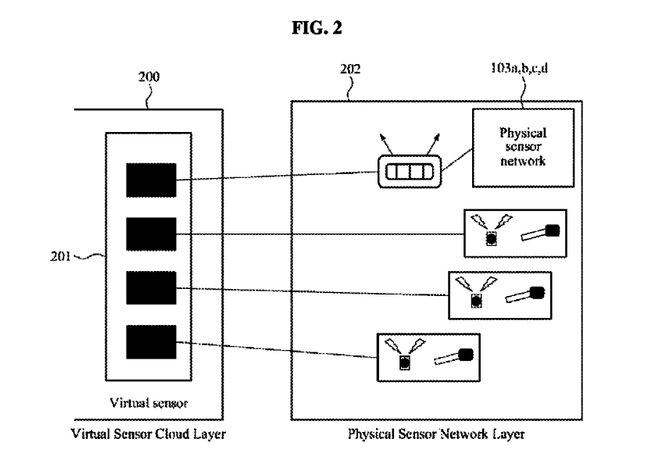
FIG. 2 is a diagram illustrating an example of a mapping between a virtual sensor cloud layer and a physical sensor network layer.

FIG. 2 is a diagram illustrating an example of a mapping between a virtual sensor cloud layer 200 and a physical sensor network layer 202. Referring to FIG. 2, the virtual sensor cloud layer 200 includes virtual sensors 201. The physical sensor network layer 202 includes the physical sensor networks 103a, 103b, 103c, and 103d of FIG. 1. The physical sensor network layer 202 is registered to the virtual sensor cloud layer 200 to establish a one-to-one connection between each pair of the virtual sensor 201 and the respective gateway corresponding to the physical sensor network 103a, 103b, 103c, or 103d. Each of the physical sensor networks 103a, 103b, 103c, and 103d can include the network of physical sensors, as discussed above, or a mote sensor, that can be represented as the single virtual sensor 201. The mote sensor is an autonomous, compact-device sensor unit that also includes a capability of processing and communicating wirelessly.

The virtual sensor cloud layer 200 corresponds to the virtual sensor clouds 102a and 102b of FIG. 1 that provides a sensor management and sharing mechanism as the IaaS. As discussed above, the different SaaS applications in the service cloud 101 of FIG. 1 with different requirements may request the sensor data from the virtual sensor clouds 102a and 102b. The virtual sensor clouds 102a and 102b provide, to the SaaS applications, the requested data in the abstract format via the virtual sensors 201.

The virtual sensor cloud 102a or 102b includes a virtualization manager (e.g., the VMs), a virtual sensor cloud controller, and a VM host. The virtualization manager receives the sensor data from the physical sensors, and transmits the data to the SaaS applications in a format requested by the applications via the virtual sensors 201. The virtualization manager enables sharing of the sensor data with the different SaaS applications with the different requirements simultaneously. That is, the virtualization manager provides abstraction of the physical sensor networks 103a, 103b, 103c, and 103d via the virtual sensors 201. The virtualization manager enables the connections between the physical sensor networks 103a, 103b, 103c, and 103d and the VM host including the virtual sensors 201 through hardware interfaces that may include, for example, RS-485, RS-422, RS-232, Line Print Terminal (LPT), Universal Serial Bus (USB), Ethernet, Peripheral Component Interconnect (PCI), and/or other hardware interfaces known to one of ordinary skill in the art.

The VM host is a physical machine where the VMs run. The physical machine includes underlying hardware that provides computing resources, such as a processing power, memory, disk, network 110's, and/or other computing resources known to one of ordinary skill in the art.

The virtual sensor cloud controller receives the request from the service cloud 101 or the device 104 for the sensor data of the virtual sensors 201. The virtual sensor cloud controller generates an appropriate VM image for system VMs, or an application byte code for process VMs, and spawns the VMs on the VM host based on the VM image or the application byte code. The VMs are spawned on-demand in response to the request from the service cloud 101 or the device 104. The VMs generate data streams from the data received from the virtual sensors 201. The VMs transmit the data to the service cloud 101 or the device 104 in the format corresponding to a template that is requested by the service cloud 101 or the device 104. For example, the template may be specified using the Sensor Modeling Language (SensorML) specification.

The virtual sensor cloud controller also handles migration of the VMs over different VM hosts for load balancing, and migration of the physical sensor networks 103a, 103b, 103c, and 103d. The virtual sensor cloud controller handles state changes of the VMs. The migration of the VMs brings flexibility and scalability in the system in terms of a number of users, a number of sensor networks, and/or a data bandwidth requirement.

Figure 3:
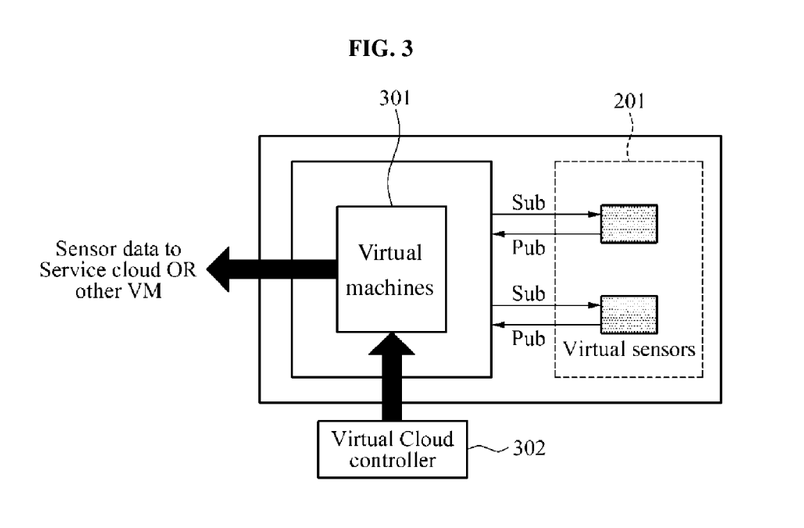
FIG. 3 is a diagram illustrating an example of a data flow from a WSN to a service cloud through Virtual Machines (VMs).

FIG. 3 is a diagram illustrating an example of a data flow from a WSN to a service cloud through VMs 301. FIG. 3 further depicts a virtual sensor cloud controller 302 and the virtual sensors 201 of FIG. 2. The connections between the VMs 301 and the virtual sensors 201 use a Pub-Sub (Publish-Subscribe) mechanism.

The Pub-Sub mechanism is a messaging pattern in a software architecture where senders of messages, called publishers, do not program the messages to be sent directly to receivers, called subscribers. Instead, the published messages are characterized into classes, without knowledge of what, if any, subscribers there may be. The subscribers express interest in one or more of the classes, and only receive the published messages that are of interest, without knowledge of what, if any, publishers there are.

The virtual sensor cloud controller 302 spawns and manages the VMs 301. Physical sensors of the WSN are virtualized through the VMs 301. In more detail, the VMs 301 may include system VMs or process VMs as determined by bandwidths required by the sensors. The system VMs run guest operating systems. The process VMs may include a Java VM, a Dalvik VM, and/or other process VMs known to one of ordinary skill in the art. The VMs 301 subscribe to and receive the sensor data from the virtual sensors 201, process the data, and transmit the processed data to end users through the service cloud 101 and/or the devices 104, or to other VMs. The VMs 301 are managed through a customized management layer, which is completely indigenous. The VMs 301 are resources that can be migrated seamlessly from a VM host to another VM host without user intervention.

The VMs 301 transmit the sensor data to the service cloud 101 and/or the other VMs in a format corresponding to a template that is requested by a requesting application. For example, the template may be specified by a SensorML specification used to describe sensor systems and a processing of observations from the sensor systems. The SensorML specification provides a framework that may encode a sensor discovery, the observations, geolocation information, accuracy information, manufacture information, and/or other sensor information known to one of ordinary skill in the art. The SensorML specification also provides a functional model of the physical sensors and an Extensible Markup Language (XML) encoding to describe the sensors and their observations. In the SensorML specification, the XML encoding is specified using an XML schema. Referring to FIG. 3, the VMs 301 receive the data from the virtual sensors 201, and formats the data based on the SensorML specification.

Figure 4:
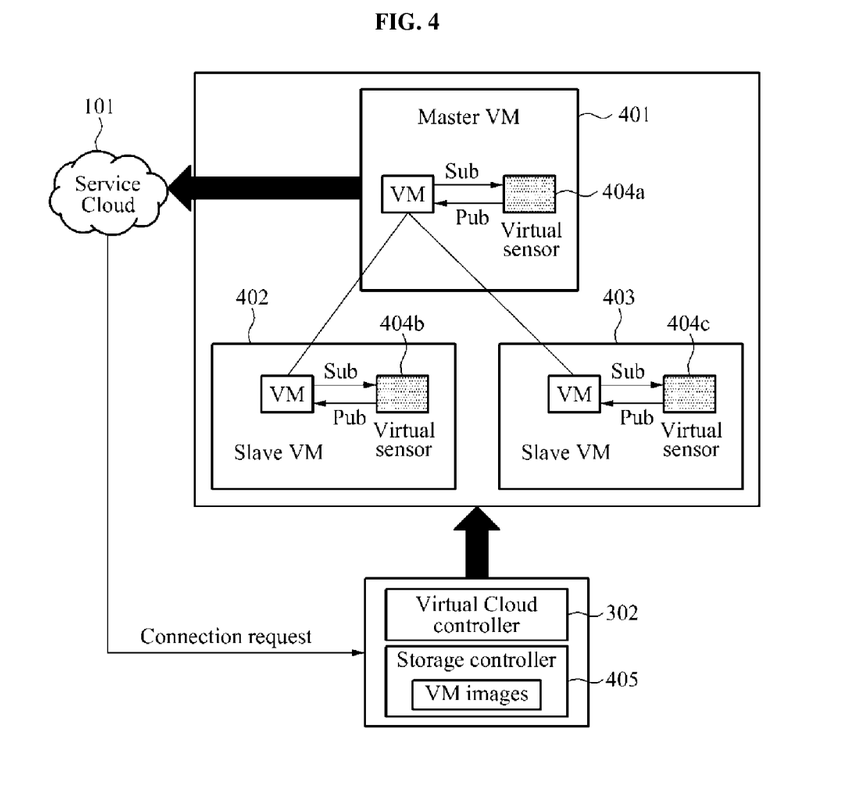
FIG. 4 is a diagram illustrating an example of a virtual sensor cloud.

FIG. 4 is a diagram illustrating an example of virtual sensor cloud. Referring to FIG. 4, the virtual sensor cloud includes a master VM 401, a slave VM 402, a slave VM 403, virtual sensors 404a, 404b, and 404c, the virtual sensor cloud controller 302 of FIG. 3, and a storage controller 405.

The service cloud 101 of FIG. 1 requests, from the virtual sensor cloud controller 302, the sensor data from different WSNs, which are not co-located and may be owned by different owners. Accordingly, the service cloud 101 requests an initiation of a connection to the virtual sensor cloud controller 302 to receive the data from the WSNs.

In response, the virtual sensor cloud controller 302 spawns a VM (i.e., the VM 401, 402, or 403) at each location of the WSNs, and the VM may interact with many different virtual sensors. In the example, only one virtual sensor 404a, 404b, or 404c per VM is considered. The VMs 401, 402, and 403 are categorized as the master VM 401 and the slave VMs 402 and 403.

In more detail, the virtual sensor cloud controller 302 receives, from the service cloud 101, a template for a requested data format, and prepares VM images of the VMs 401, 402, and 403 in the storage controller 405, based on the request. Based on the VM images, the virtual sensor cloud controller 302 then spawns the VMs 401, 402, and 403 at the respective locations where the virtual sensors 404a, 404b, and 404c are located. The virtual sensor cloud controller 302 spawns the master VM 401, and the slaves VMs 402 and VM 403. The VMs 401, 402, and 403 connect to, and subscribe to and receive the data from, the virtual sensors 404a, 404b, and 404c, respectively. The master VM 401 receives the data from the slave VMs 402 and 403, formats the data based on the template, and transmits the formatted data to the service cloud 101.

The virtualization of the physical sensor networks 103a, 103b, 103c, and 103d of FIGS. 1 to 2, and the IaaS provided by the system, provide better platform independence, load balancing, and efficiency over a conventional ad-hoc process and thread based solution of sending data to the service cloud 101. The comparison of these two solution is as follows.

The cloud based WSN system utilizing virtualized WSNs provides better platform independence over the conventional solution. The gateway in each of the physical sensor networks 103a, 103b, 103c, 103d can include different capabilities and different platforms. For example, the system can be a server that receives high bandwidth (BW) data from a large number of heavy data generating sensors (such as wireless video cameras) running an enterprise server Operating System (OS). Alternatively, the system may be a small embedded gateway that receives low BW temperature data from physical sensor networks running a very lightweight OS. Accordingly, a platform on which data collection, manipulation, and forwarding is being done should be abstracted from a user who wants to create a logic to collect data from virtual sensors or nodes. This allows users to use different sensor networks flexibly. The VMs 301 of FIG. 3 that are provided by the system provide a way to abstract the platform on which the logic for the data collection, manipulation, and forwarding happens. This allows a developer to develop a single logic, and deploy it over all heterogeneous resources available. The disadvantage of using the conventional ad-hoc process and thread based solution for data collection, manipulation, and forwarding is that it requires recompilation/porting of a logic for different platforms.

The cloud based WSN system utilizing virtualized WSNs also provides better load balancing over the conventional solution. In a cloud based WSN scenario, a load is likely to be uneven and highly dynamic. There is a high chance of a network not being of much interest for a long time and becoming heavily-loaded with data requests at other times. For example, a natural disaster warning system in an area can be heavily-loaded with requests during a natural calamity. Many other different systems may become interested in the natural disaster warning system simultaneously for disaster avoidance/recovery. The VMs 301 allow a load to be balanced by allowing dynamic movement of the VMs 301 over different systems. Also, a change in a VM role (i.e., Master/Slave) for data movement and manipulation is possible and is much easier than the conventional solution, as shown in FIG. 4. The disadvantage with the conventional ad-hoc processes and thread based solution is that it requires external assistance for load balancing.

The cloud based WSN system utilizing virtualized WSNs further provides better efficiency over the conventional solution. High computability and power efficiency may be needed for WSN systems. Existing cloud computing may use system VMs as they provide flexibility. However, these system VMs are heavier than processes and threads due to a dynamic binary conversion required for a whole system. That is, the processes and threads are more computationally efficient than running the system VMs. The system described herein enables process VMs to be deployed whenever needed, along with system VMs. Thus, the system obtains an efficiency of the process VMs without sacrificing benefits of the system VMs.

Figure 5:
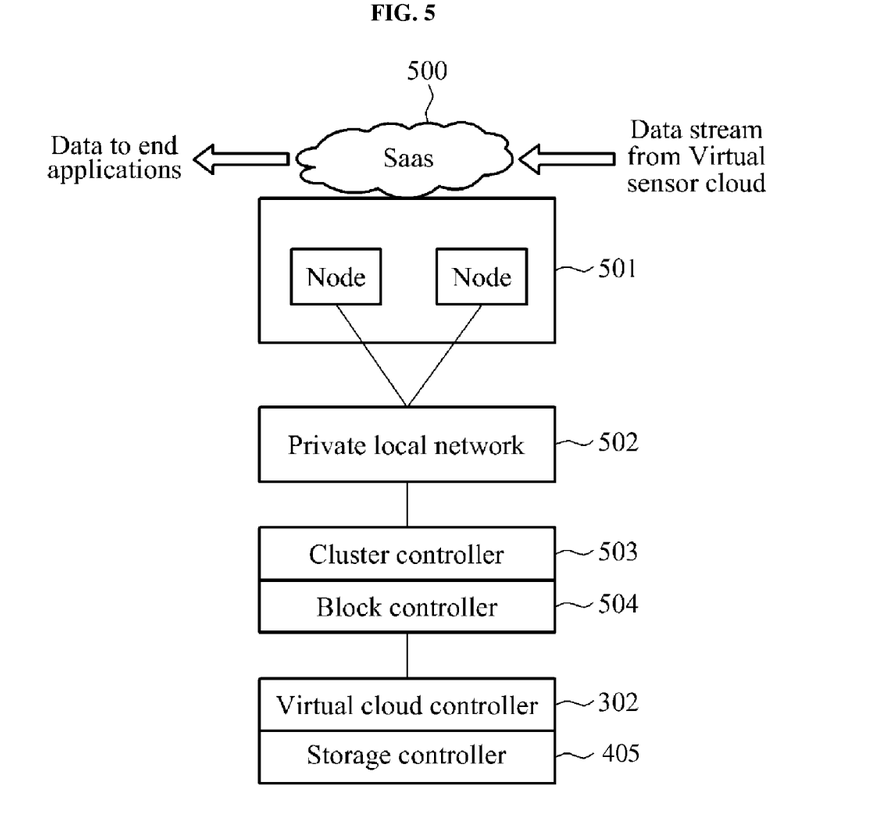
FIG. 5 is a diagram illustrating an example of a Software as a Service (SaaS) application hosted on a private cloud.

FIG. 5 is a diagram illustrating an example of a SaaS application hosted on a private cloud 500. Referring to FIG. 5, the private cloud 500 includes components of an infrastructure that enable scalable hosting of the SaaS application. In more detail, the private cloud 500 includes the virtual sensor cloud controller 302 of FIGS. 3 to 4, the storage controller 405 of FIG. 4, nodes 501, a private local network 502, a cluster controller 503, and a block controller 504.

The private local network 502 connects all of the components in the private cloud 500. The cluster controller 503 manages several peripheral clusters, and the block controller 504 controls a blocking process. Data flows into the SaaS application from the virtual sensor cloud 102a or 102b, and flows out of the SaaS application to end applications on the devices 104.

Figure 6:
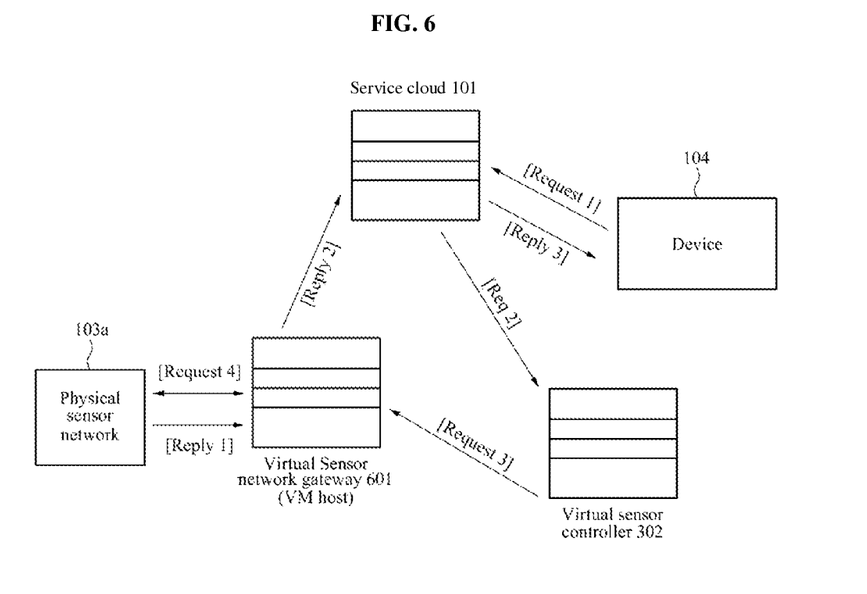
FIG. 6 is a diagram illustrating an end-to-end request and data flow in a cloud based WSN system utilizing virtualized WSNs.

FIG. 6 is a diagram illustrating an example of an end-to-end request and data flow in the cloud based WSN system utilizing virtualized WSNs. Referring to FIGS. 1, 2, 3, 4, and 6, the device 104 is connected to the physical sensor network 103a through the service cloud 101, the virtual sensor cloud controller 302, and a virtual sensor network gateway 601. The device 104 initiates a request for service of sensor data from the physical sensor network 103a. A connection establishment flow for the data request is depicted in the example as [Request 1], [Request 2], [Request 3], and [Request 4].

[Request 1]: The device 104 transmits the request for the sensor data to an application running as a SaaS on the service cloud 101. Alternatively, the device 104 can be directly connected to the virtual sensor cloud 102*a* of FIG. 1, and directly transmit the request to the virtual sensor cloud 102*a*.

[Request 2]: The SaaS application searches for appropriate physical sensors, and starts provisioning for the virtual sensors 201 of FIG. 2 in the virtual sensor cloud 102*a*. The SaaS application provides, to the virtual sensor cloud controller 302, the request and a data format specification for a data format the application expects to receive.

[Request 3]: The virtual sensor cloud controller 302 creates a customized VM image of the VMs 301 of FIG. 3, and spawns the VMs 301 on the appropriate virtual sensor network gateway 601, i.e., a VM host.

[Request 4]: The VMs 301 subscribe to the sensor data of the virtual sensor 404*a* of FIG. 4 that is connected to the physical sensor network 103*a* and that enables real-time data transfer.

A data transfer flow in response to the data request is depicted in the example as [Reply 1], [Reply 2], and [Reply 3]

[Reply 1]: The VMs 301 receive the sensor data from the virtual sensor 404*a* that is connected to the physical sensor network 103*a* and that enables real-time data transfer.

[Reply 2]: The VMs 301 reformat the sensor data in the requested data format, and transmits the reformatted data to the SaaS application in the service cloud 101.

[Reply 3]: The SaaS application performs computationally intensive processing of the sensor data, and transmits an end result of the processing to the device 104 to be displayed and used by a requesting user.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments accomplishing the examples disclosed herein can be easily construed by programmers skilled in the art to which the examples pertain based on and using the flow diagrams and block diagrams of the figures and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus in a system comprising a wireless sensor network (WSN), a service cloud, and a device, the apparatus comprising:
   a virtual sensor configured to receive data from one of a plurality of physical sensors in the WSN;
   a virtual sensor controller configured to
      receive a request for the data and a format specification of the data from the service cloud or the device, and
      spawn a virtual machine (VM) on a VM host based on the request; and
   the VM configured to receive the data from the virtual sensor and transmit the received data to the service cloud or the device,
   wherein the virtual sensor controller is executed by computing resources and each of the plurality of physical sensors are configured to monitor and capture the data at different locations and the VM host is computing resources where the VM runs,
   wherein the VM comprises:
      a slave VM configured to receive a first data from a first virtual sensor, and
      a master VM configured to receive a second data from a second virtual sensor, receive the first data from the slave VM, and transmit the first and second data to the service cloud or the device,
   wherein the slave VM is changed to another master VM to move and manipulate the data, wherein the another master VM is configured to receive a third data from a third virtual sensor, receive a fourth data from another slave VM, and transmit the third and fourth data to the service cloud or the device.

2. The apparatus of claim 1, wherein the VM is further configured to:
   reformat the data based on the format specification.

3. The apparatus as in claim 1, wherein the virtual sensor is an abstraction of the physical sensor.

4. The apparatus as in claim 1, wherein the VM is further configured to:
   transmit the data to the device with bypass of the service cloud.

5. The apparatus as in claim 1, wherein:
   the apparatus comprises an infrastructure as a service (IaaS); and
   the service cloud comprises a software as a service (SaaS).

6. The apparatus as in claim 1, wherein the virtual sensor controller is further configured to:
   receive the request from the device with bypass of the service cloud.

7. The apparatus of claim 1, wherein the virtual sensor controller is further configured to:
   move the VM to another VM host for load balancing.

8. The apparatus of claim 1, wherein
the first virtual sensor configured to receive the first data among the data from a first
physical sensor in the WSN; and
the second virtual sensor configured to receive the second data among the data from a second physical sensor in the WSN.

9. The apparatus of claim 1, wherein the VM comprises a system VM and/or a process VM.

10. A method of a virtual sensor cloud in a system comprising a wireless sensor network (WSN), a service cloud, and a device, the method comprising:
receiving data from one of a plurality of physical sensors in the WSN;
receiving a request for the data and a format specification of the data from the service cloud or the device;
spawning a virtual machine (VM) on a VM host based on the request, the VM receiving the data from the virtual sensor;
and
transmitting the received data to the service cloud or the device
wherein the virtual sensor controller is executed by computing resources and each of the plurality of physical sensors configured to monitor and capture the data at different locations and the VM host is computing resources where the VM runs,
wherein the VM comprises:
a slave VM configured to receive a first data from a first virtual sensor; and
a master VM configured to receive a second data from a second virtual sensor, receive the first data from the slave VM, and transmit the first and second data to the service cloud or the device,
wherein the slave VM is changed to another master VM to move and manipulate the data, wherein the another master VM is configured to receive a third data from a third virtual sensor, receive a fourth data from another slave VM, and transmit the third and fourth data to the service cloud or the device.

11. The method of claim 10, further comprising:
reformatting the data based on the format specification.

12. The method as in claim 10, wherein the virtual sensor cloud comprises a virtual sensor that is an abstraction of the physical sensor.

13. The method as in claim 10, further comprising:
transmitting the data to the device with bypass of the service cloud.

14. The method as in claim 10, wherein:
the virtual sensor cloud comprises an infrastructure as a service (IaaS); and
the service cloud comprises a software as a service (SaaS).

15. The method as in claim 10, further comprising:
receiving the request from the device with bypass of the service cloud.

16. The method of claim 10, further comprising:
moving the VM to another VM host for load balancing.

17. The method of claim 10, further comprising:
receiving, by the first virtual sensor, the first data among the data from a first physical sensor in the WSN; and
receiving, by the second virtual sensor, the second data among the data from a second physical sensor in the WSN.

18. The method of claim 10, wherein the VM comprises a system VM and/or a process VM.

19. A non-transitory computer-readable storage medium storing a program comprising instructions to cause a computer to perform the method of claim 10.

20. An architecture in a system comprising a wireless sensor network (WSN), a service cloud, and a device, the architecture comprising:
a virtual sensor configured to receive data from one of a plurality of physical sensors in the WSN;
a virtual sensor controller configured to
receive a request for the data and a format specification of the data from the service cloud or the device, and
spawn a virtual machine (VM) on a VM host based on the request; and
the VM configured to receive the data from the virtual sensor and send the received data to the service cloud or the device,
wherein the virtual sensor controller is executed by computing resources and each of the plurality of physical sensors are configured to monitor and capture the data at different locations and the VM host is computing resources where the VM runs,
wherein the VM comprises:
a slave VM configured to receive a first data from a first virtual sensor, and
a master VM configured to receive a second data from a second virtual sensor, to receive the first data from the slave VM, and to transmit the first and second data to the service cloud or the device,
wherein the slave VM is changed to another master VM to move and manipulate the data, wherein the another master VM is configured to receive a third data from a third virtual sensor, receive a fourth data from another slave VM, and transmit the third and fourth data to the service cloud or the device.

* * * * *